(12) United States Patent
Lee et al.

(10) Patent No.: US 12,309,234 B2
(45) Date of Patent: May 20, 2025

(54) SYSTEM AND METHOD FOR TRANSFERRING A CALL

(71) Applicant: APPLE INC., Cupertino, CA (US)

(72) Inventors: Teck Yang Lee, Cupertino, CA (US); Najeeb M. Abdulrahiman, Fremont, CA (US); Vikram B. Yerrabommanahalli, Saratoga, CA (US); Arun G. Mathias, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 1531 days.

(21) Appl. No.: 14/500,526

(22) Filed: Sep. 29, 2014

(65) Prior Publication Data

US 2015/0350339 A1 Dec. 3, 2015

Related U.S. Application Data

(60) Provisional application No. 62/005,969, filed on May 30, 2014.

(51) Int. Cl.
*H04L 67/148* (2022.01)
*H04L 65/1016* (2022.01)
(Continued)

(52) U.S. Cl.
CPC ........ *H04L 67/148* (2013.01); *H04L 65/1016* (2013.01); *H04L 65/1069* (2013.01);
(Continued)

(58) Field of Classification Search
CPC ............... H04L 67/148; H04L 65/1093; H04L 65/1083; H04L 65/1069; H04L 65/1016; H04L 65/1094; H04M 3/58; H04W 4/16
(Continued)

(56) References Cited

U.S. PATENT DOCUMENTS 7,570,756 B2 * 8/2009 Park ................... H04L 29/06027
370/331
7,979,558 B2 * 7/2011 Mahdi ................. H04L 65/1016
709/227

(Continued)

OTHER PUBLICATIONS

SIP and SDP based content adaptation during real-time video streaming in Future InternetsRamakrishna, M; Karunakar, A K. Multimedia Tools and Applications 76.20: 21171-21191. Dordrecht: Springer Nature B.V. (Oct. 2017) (Year: 2017).*

(Continued)

*Primary Examiner* — Michael Won
(74) *Attorney, Agent, or Firm* — Fay Kaplun & Marcin, LLP

(57) ABSTRACT

Described are systems and methods for transferring calls between multiple stations. An exemplary system includes a first station and a second station that establishes a first communication session having a first call identification with the first station. The system further includes a third station and a network device that includes stored data indicating a relationship between the first station and the third station, the network device configured to receive the first call identification from the first station and transmit the first call identification to the third station based on the relationship, wherein the third station is configured to receive the first call identification and send an invite to the second station to replace the first communication session with the first station with a second communication session with the third station, the invite including the first call identification and a second call identification that identifies the second communication session.

20 Claims, 8 Drawing Sheets

(51) Int. Cl.
*H04L 65/1069* (2022.01)
*H04L 65/1083* (2022.01)
*H04L 65/1093* (2022.01)
*H04L 65/1094* (2022.01)
*H04M 3/58* (2006.01)
*H04W 4/16* (2009.01)

(52) U.S. Cl.
CPC ...... *H04L 65/1083* (2013.01); *H04L 65/1093* (2013.01); *H04L 65/1094* (2022.05); *H04M 3/58* (2013.01); *H04W 4/16* (2013.01)

(58) Field of Classification Search
USPC ............... 709/201, 205, 209, 227, 232, 248
See application file for complete search history.

(56) References Cited

U.S. PATENT DOCUMENTS

| | | | | |
|---|---|---|---|---|
| 8,369,311 | B1* | 2/2013 | Kirchhoff | H04M 3/42263 370/352 |
| 9,609,066 | B2* | 3/2017 | Cutler | H04L 67/141 |
| 10,530,932 | B2* | 1/2020 | Tevonian | H04L 65/1083 |
| 2002/0073150 | A1* | 6/2002 | Wilcock | H04L 67/38 709/204 |
| 2002/0075304 | A1* | 6/2002 | Thompson | G06F 3/0481 715/751 |
| 2002/0091832 | A1* | 7/2002 | Low | G06Q 30/02 709/227 |
| 2003/0154398 | A1* | 8/2003 | Eaton | G06Q 30/08 709/227 |
| 2006/0026288 | A1* | 2/2006 | Acharya | H04L 65/1104 709/227 |
| 2006/0077956 | A1* | 4/2006 | Saksena | H04M 7/006 370/352 |
| 2006/0256751 | A1* | 11/2006 | Jagadeesan | H04L 29/06027 370/331 |
| 2007/0189220 | A1* | 8/2007 | Oberle | H04L 29/06027 370/331 |
| 2007/0242665 | A1* | 10/2007 | Habetha | H04W 76/11 370/389 |
| 2007/0254625 | A1* | 11/2007 | Edge | H04L 65/1016 455/404.1 |
| 2008/0034057 | A1* | 2/2008 | Kumar | H04L 67/14 709/217 |
| 2008/0089307 | A1* | 4/2008 | Tuijn | H04L 65/1083 370/342 |
| 2008/0101291 | A1* | 5/2008 | Jiang | H04L 63/08 370/331 |
| 2008/0160991 | A1* | 7/2008 | Constantinof | H04W 36/0022 455/426.2 |
| 2008/0186954 | A1* | 8/2008 | Kumarasamy | H04L 65/40 370/352 |
| 2009/0022106 | A1* | 1/2009 | Ue | H04W 40/36 370/331 |
| 2009/0034472 | A1* | 2/2009 | Purnadi | H04L 67/14 370/331 |
| 2009/0034516 | A1* | 2/2009 | Liu | H04L 65/1104 370/353 |
| 2009/0132712 | A1* | 5/2009 | P | H04L 65/1094 709/227 |
| 2009/0150562 | A1* | 6/2009 | Kim | H04N 7/173 709/238 |
| 2009/0210536 | A1* | 8/2009 | Allen | H04M 3/58 709/227 |
| 2010/0011108 | A1* | 1/2010 | Clark | H04W 76/40 709/227 |
| 2010/0057853 | A1* | 3/2010 | Xu | H04L 61/309 709/204 |
| 2010/0070641 | A1* | 3/2010 | Allen | H04L 67/04 709/230 |
| 2010/0128696 | A1* | 5/2010 | Fantini | H04L 29/12028 370/331 |
| 2010/0146142 | A1* | 6/2010 | Long | H04L 65/1096 709/231 |
| 2010/0257273 | A1* | 10/2010 | Mutikainen | H04L 65/1086 709/227 |
| 2010/0312832 | A1* | 12/2010 | Allen | H04L 65/1016 709/204 |
| 2010/0312897 | A1* | 12/2010 | Allen | H04L 12/1822 709/227 |
| 2011/0116473 | A1* | 5/2011 | Shaheen | H04L 65/1093 370/331 |
| 2011/0122864 | A1* | 5/2011 | Cherifi | H04M 3/58 370/352 |
| 2011/0188410 | A1* | 8/2011 | Levin | H04L 12/16 370/259 |
| 2011/0238862 | A1* | 9/2011 | Chaturvedi | H04L 63/0807 709/238 |
| 2011/0252146 | A1* | 10/2011 | Santamaria | H04L 65/1083 709/227 |
| 2011/0289203 | A1* | 11/2011 | Braudes | H04L 65/1006 709/227 |
| 2012/0311026 | A1* | 12/2012 | Yi | H04L 67/14 709/203 |
| 2012/0327812 | A1 | 12/2012 | Xiao et al. | |
| 2013/0142085 | A1* | 6/2013 | Haspekian | H04L 65/1006 370/259 |
| 2013/0173812 | A1* | 7/2013 | Ezell | H04L 65/1093 709/228 |
| 2013/0177011 | A1* | 7/2013 | Carter | H04L 29/08621 370/352 |
| 2013/0290494 | A1* | 10/2013 | Goudarzi | H04L 65/1046 709/219 |
| 2013/0297704 | A1* | 11/2013 | Alberth, Jr. | H04L 65/1083 709/205 |
| 2014/0006630 | A1* | 1/2014 | Cai | H04L 65/1006 709/227 |
| 2014/0047348 | A1* | 2/2014 | Stewart | G06F 3/0484 715/738 |
| 2014/0274086 | A1* | 9/2014 | Boerjesson | H04L 61/106 455/450 |
| 2015/0016308 | A1* | 1/2015 | Long | H04L 65/1069 370/259 |
| 2015/0039775 | A1* | 2/2015 | Benner | H04L 67/146 709/228 |
| 2015/0156854 | A1* | 6/2015 | Cawse | B32B 5/22 174/2 |
| 2015/0207827 | A1* | 7/2015 | Jheng | H04L 65/1046 370/260 |
| 2015/0271339 | A1* | 9/2015 | Klein | H04M 3/543 455/417 |
| 2015/0350333 | A1* | 12/2015 | Cutler | H04W 72/04 709/227 |
| 2015/0350339 | A1* | 12/2015 | Lee | H04L 67/148 709/227 |
| 2015/0351146 | A1* | 12/2015 | Lee | H04W 76/023 370/329 |
| 2016/0150446 | A1* | 5/2016 | Kallio | H04L 65/1006 370/331 |
| 2016/0173540 | A1* | 6/2016 | Linden | G06Q 30/0633 709/228 |
| 2017/0126895 | A1* | 5/2017 | Tevonian | H04M 3/54 |
| 2017/0214534 | A1* | 7/2017 | Rivas Molina | H04L 65/105 |
| 2018/0063764 | A1* | 3/2018 | Bollapalli | H04L 65/1073 |
| 2018/0091655 | A1* | 3/2018 | Verma | H04W 4/023 |
| 2018/0198908 | A1* | 7/2018 | Hodge | H04L 65/1046 |
| 2018/0359205 | A1* | 12/2018 | Karnati | H04L 51/16 |
| 2019/0005955 | A1* | 1/2019 | Bhattacharya | G10L 15/22 |

(56) References Cited

U.S. PATENT DOCUMENTS

2020/0351818 A1* 11/2020 Park .................. H04W 68/02
2021/0392551 A1* 12/2021 Rubenstein ....... H04W 36/0069

OTHER PUBLICATIONS

Practical authentication scheme for SIPWu, Shuhua; Pu, Qiong; Kang, Fei. Peer-To-Peer Networking and Applications 6.1: 61-74. Norwell: Springer Nature B.V. (Mar. 2013) (Year: 2013).*

* cited by examiner

SYSTEM AND METHOD FOR TRANSFERRING A CALL

INCORPORATION BY REFERENCE/PRIORITY CLAIM

This application claims priority to U.S. Provisional Application Ser. No. 62/005,969 entitled "System and Method for Transferring a Call," filed on May 30, 2014, which is incorporated herein, in its entirety, by reference.

BACKGROUND INFORMATION

A user may utilize a plurality of different stations (e.g., electronic devices) that are each capable of connecting to one or more networks. Examples of different devices may include a personal mobile phone, a work issued mobile phone, a tablet computer, a desktop computer, a VoIP phone etc. Each station may be capable of performing a telephony function or other functionality in which a communication session is established with a station of another user. The user may desire to continue the current communication session on a different device than the device with which communication session was originally established.

SUMMARY

In one exemplary embodiment, a system having three stations and a network device for transferring calls between the different stations is described. In the system, a second station establishes a first communication session with a first station, the first communication session having a first call identification that identifies the first communication session. The network device includes stored data indicating a relationship between the first station and a third station, the network device configured to receive the first call identification from the first station and transmit the first call identification to the third station based on the relationship. The third station is configured to receive the first call identification and send an invite to the second station to replace the first communication session with the first station with a second communication session with the third station, the invite including the first call identification and a second call identification that identifies the second communication session.

In a further exemplary embodiment described below, a method is performed by a first station. The method includes receiving a first call identification of a first communication session between a second station and a third station, wherein the first call identification is received from a network device based on information stored at the network device indicating the first station is related to the second station, receiving an input indicating the first communication session is to be transferred from the second station to the first station, transmitting an invite including the first call identification and a second call identification to the third station, wherein the invite indicates to the third station that the first communication session with the second station is to be terminated and a second communication session with the first station is to be established, wherein the second communication session is identified by the second call identification, and establishing the second communication session with the third station.

In another exemplary embodiment described below, a method is performed by a first station. The method includes receiving a, first call identification of a first communication session between a second station and a third station, wherein the first call identification is received from a network device based on information stored at the network device indicating the first station is related to the second station, receiving an input indicating the first communication session is to be transferred from the second station to the first station, transmitting an invite including the first call identification and a second call identification to the third station, wherein the invite indicates to the third station that the first communication session with the second station is to be terminated and a second communication session with the first station is to be established, wherein the second communication session is identified by the second call identification and establishing the second communication session with the third station.

DETAILED DESCRIPTION

Figure 1:
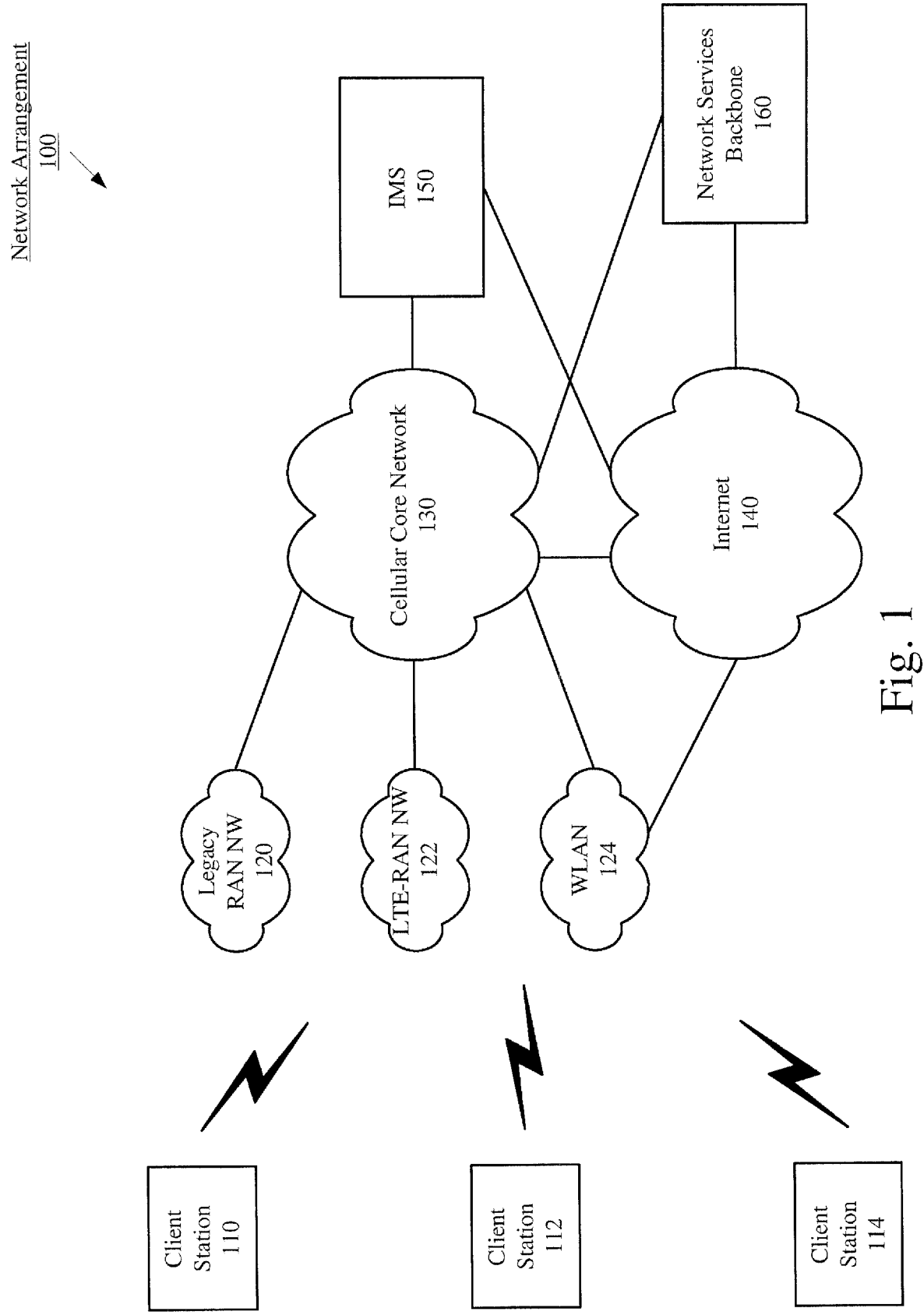
FIG. 1 shows an exemplary network arrangement.

The exemplary embodiments may be further understood with reference to the following description and the related appended drawings, wherein like elements are provided with the same reference numerals. The exemplary embodiments are related to a system and method for transferring a call from a first station to a second station where the first and second stations are associated with one another. Specifically, the association between the first and second stations enables a call identification to be propagated from the first station to the second station upon the call being established with a further station.

FIG. 1 shows an exemplary network arrangement 100. The exemplary network arrangement 100 includes client stations 110-114. In this example, it is assumed that the client stations 100-114 are associated with a single user. For example, the client station 110 may be the user's mobile phone, the client station 112 may be the user's tablet computer and the client station 114 may be the user's desktop computer. Those skilled in the art will understand that, in addition to the examples provided above, the client stations may be any type of electronic component that is configured to communicate via a network, e.g., smartphones, phablets, embedded devices, etc. It should also be understood that an actual network arrangement may include any number of client stations associated with any number of users and that the user may be associated with more or less client stations. The example of three (3) client stations associated with one (1) user is only provided for illustrative purposes.

Each of the client stations 110-114 may be configured to communicate directly with one or more networks. In this example, the networks with which the client stations 110-114 may communicate are a legacy radio access network (RAN) 120, a Long Term Evolution radio access network (LTE-RAN) network 122 and a wireless local area network (WLAN) 124. In this example, each of the networks 120-124 is a wireless network with which the client stations 110-114 may communicate wirelessly. However, it should be understood that the client stations 110-114 may also communicate with other types of networks using a wired connection. It should also be understood that not all of the client stations 110-114 may communicate directly with each of the networks 120-124. For example, the client station 114 may not have an LTE chipset and therefore may not have the ability to communicate with the LTE-RAN 122. Again, the use of three (3) networks is only exemplary and there may be any other number of networks with which the client stations 110-114 may communicate.

The legacy RAN 120 and the LTE-RAN 122 are portions of cellular networks that may be deployed by cellular providers (e.g., Verizon, AT&T, Sprint, T-Mobile, etc.). These networks 120 and 122 may include, for example, base client stations (Node Bs, eNodeBs, HeNBs, etc.) that are configured to send and receive traffic from client stations that are equipped with the appropriate cellular chip set. Examples of the legacy RAN 120 may include those networks that are generally labeled as 2G and/or 3G networks and may include circuit switched voice calls and packet switched data operations. Those skilled in the art will understand that the cellular providers may also deploy other types of networks, including further evolutions of the cellular standards, within their cellular networks. The WLAN 124 may include any type of wireless local area network (WiFi, Hot Spot, IEEE 802.11x networks, etc.). Those skilled in the art will understand that there may be thousands, hundreds of thousands or more of different WLANs deployed in the United States alone. For example, the WLAN 124 may be the user's home network, the user's work network, a public network (e.g., at a city park, coffee shop, etc.). Generally, the WLAN 124 will include one or more access points that allow the client stations 110-114 to communicate with the WLAN 124.

In addition to the networks 120-124, the network arrangement 100 also includes a cellular core network 130 and the Internet 140. The cellular core network 130, the legacy RAN 120 and the LTE-RAN 122 may be considered a cellular network that is associated with a particular cellular provider (e.g., Verizon, AT&T, Sprint, T-Mobile, etc.). The cellular core network 130 may be considered to be the interconnected set of components that manages the operation and traffic of the cellular network. The interconnected components of the cellular core network 130 may include any number of components such as servers, switches, routers, etc. The cellular core network 130 also manages the traffic that flows between the cellular network and the Internet 140.

The network arrangement 100 also includes an IP Multimedia Subsystem (IMS) 150. The IMS 150 may be generally described as an architecture for delivering multimedia services to the client stations 110-114 using the IP protocol. The IMS 150 may include a variety of components to accomplish this task. For example, a typical IMS 150 includes a Home Subscriber Server (HSS) that stores subscription information for a user of the client stations 110-114. This subscription information is used to provide the correct multimedia services to the user. Other exemplary components of the IMS 150 will be described below, as needed. The IMS 150 may communicate with the cellular core network 130 and the Internet 140 to provide the multimedia services to the client stations 110-114. The IMS 150 is shown in close proximity to the cellular core network 130 because the cellular provider typically implements the functionality of the IMS 150. However, it is not necessary for this to be the case. The IMS 150 may be provided by another party.

Thus, the network arrangement 100 allows the client stations 110-114 to perform functionalities generally associated with computer and cellular networks. For example, the client stations 110-114 may perform voice calls to other parties, may browse the Internet 140 for information, may stream multimedia data to the client devices 110-114, etc.

However, as described above, not every client station 110-114 may have the same communication capabilities with the networks 120, 122, 124, 130, 140. This lack of communication with one or more of the networks may be due to the capabilities of the client device 110-114, e.g., the client device does not include a cellular chip, or may be due to a limitation of the network, e.g., a cellular network does not have a base client station within range of the client station. This lack of communication with one or more networks may result in the client station being unable to avail itself of the functionalities that are available via one or more of the networks.

In addition to the elements already described, the network arrangement 100 also includes a network services backbone 160 that is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the client stations 110-114 in communication with the various networks. These extensions may include the functionalities to which the client device 110-114 does not have access because of limitations of the device and/or network, some examples of which were described above. The network services backbone 160 interacts with the client devices 110-114 and/or the networks 120, 122, 124, 130, 140 to provide these extended functionalities.

The network services backbone 160 may be provided by any entity or a set of entities. In one example, the network services backbone 160 is provided by the supplier of one or more of the client stations 110-114. In another example, the network services backbone 160 is provided by the cellular network provider. In still a further example, the network services backbone 160 is provided by a third party unrelated to the cellular network provider or the supplier of the client stations 110-114.

The exemplary embodiments described herein provide an example of different types of functionalities that may be extended to client stations 110-114 and also provide an example of components and services that may be included in the network services backbone 160. In this example, the network services backbone 160 is used to associate the client stations 110-114 with a user account such that a call identification of an established call may be propagated among the client stations 110-114. However, it should be understood that the network services backbone 160 may include many other components and services that may be used to enhance the operations of the client stations 110-114 and networks.

One of the services provided by the network services backbone 160 may be to store and update associations among the different client stations 110-114. As described above, in this example, each of these client stations 110-114 are associated with the same user. Thus, the network services backbone 160 may store information that indicates this association of the user with each of the client stations 110-114 and may then also store (or link) the relationship of the client stations 110-114 with each other based on their association with the user. This association among client stations 110-114 may be used as one of the bases for the network services backbone 160 to provide the enhanced operations of the client stations 110-114.

The exemplary system and method provide a call identification of an established call to be propagated to other client stations associated with a client station being used in the call upon the call being established. Therefore, the call identification information may already be stored on the other client stations and a transfer functionality may be performed by a selected one of the other client stations as a "grab" feature of an active call so the call may continue on the selected one of the other client stations.

Figure 2:
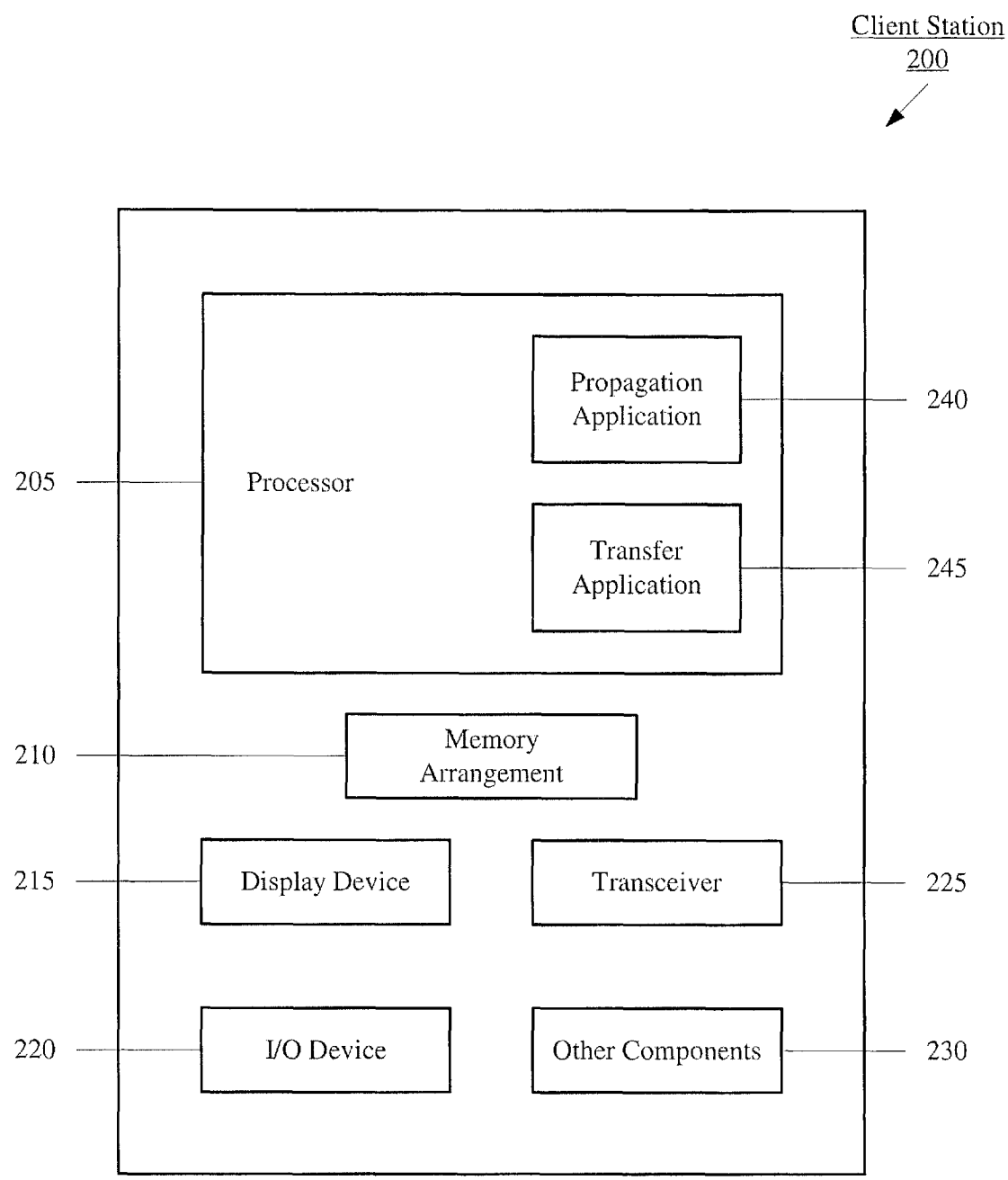
FIG. 2 shows an exemplary client station configured with a transfer functionality.

FIG. 2 shows an exemplary client station 200 configured to propagate a call identification to other associated client stations such that a transfer application may be performed by the other associated client stations. The client station 200 may also be one of the other client stations to which the call may be transferred. The client station 200 may represent any electronic device that is configured to perform wireless functionalities and may be representative of one or more of the client stations 110-114. For example, the client station 200 may be a portable device such as a tablet, a laptop, etc. In another example, the client station 200 may be a client stationary device such as a desktop terminal. The client station 100 may be configured to perform cellular and/or WiFi functionalities. The client station 200 may include a processor 205, a memory arrangement 210, a display device 215, an input/output (I/O) device 220, a transceiver 225, and other components 230. The other components 230 may include, for example, an audio input device, an audio output device, a battery, a data acquisition device, ports to electrically connect the client station 200 to other electronic devices, etc.

The processor 205 may be configured to execute a plurality of applications of the client station 200. For example, the applications may include a web browser when connected to a communication network via the transceiver 225. In another example, the processor 205 may execute a call application that enables the client station 200 to perform a call functionality. It should be note that the call functionality may refer to any type of communication session. For example, the communication session may be an audio only call functionality (e.g., phone call), an audio/video communication functionality, etc. However, for illustrative purposes, the communication session is represented as a call functionality herein. In yet another example, the processor 205 may execute a propagation application 240. As will be described in further detail below, the propagation application 240 may propagate or transmit a call identification for an established call to be provided to the other associated client stations. In a further example, the processor 205 may execute a transfer application 245. The transfer application 245 may grab an active call. For example, if the client station 200 is one of the other associated client stations, the transfer application 245 may utilize a call identification that has already been provided to transfer the call to the call application of the station 200.

It should be noted that the above noted applications each being an application (e.g., a program) executed by the processor 205 is only exemplary. The functionality associated with the applications may also be represented as a separate incorporated component of the client station 200 or may be a modular component coupled to the client station 200, e.g., an integrated circuit with or without firmware.

The memory 210 may be a hardware component configured to store data related to operations performed by the client station 200. Specifically, the memory 210 may store data related to the call application, the propagation application 240, and the transfer application 245. For example, a call identification may be generated by the call application or provided by the other participant of the call session. The call identification may be stored in the memory 210. The call identification may also be stored by the other associated client stations. The display device 215 may be a hardware component configured to show data to a user while the I/O device 220 may be a hardware component that enables the user to enter inputs. It should be noted that the display device 215 and the I/O device 220 may be separate components or integrated together such as a touchscreen.

The transceiver 225 may be a hardware component configured to transmit and/or receive data. That is, the transceiver 225 may enable communication with other electronic devices directly or indirectly through a network based upon an operating frequency of the network. The transceiver 225 may operate on a variety of different frequencies or channels (e.g., set of consecutive frequencies) that are related to the call functionality. Thus, an antenna (not shown) coupled with the transceiver 225 may enable the transceiver 225 to operate on a WiFi frequency band.

It should again be noted that since the client station 200 of FIG. 2 is representative of the client stations 110-114 of FIG. 1, each of the client stations 110-114 may all be configured with the above described components and applications. For example, the client stations 110-114 may be associated with each other based upon a common operating platform. An update to the operating platform may include the installation of the above noted applications. Accordingly, the client stations 110-114 may all be configured to participate in a call session using the call application, propagate a call identification for the call session to the other client stations, and transfer the call session from the participating client station to itself.

Figure 3:
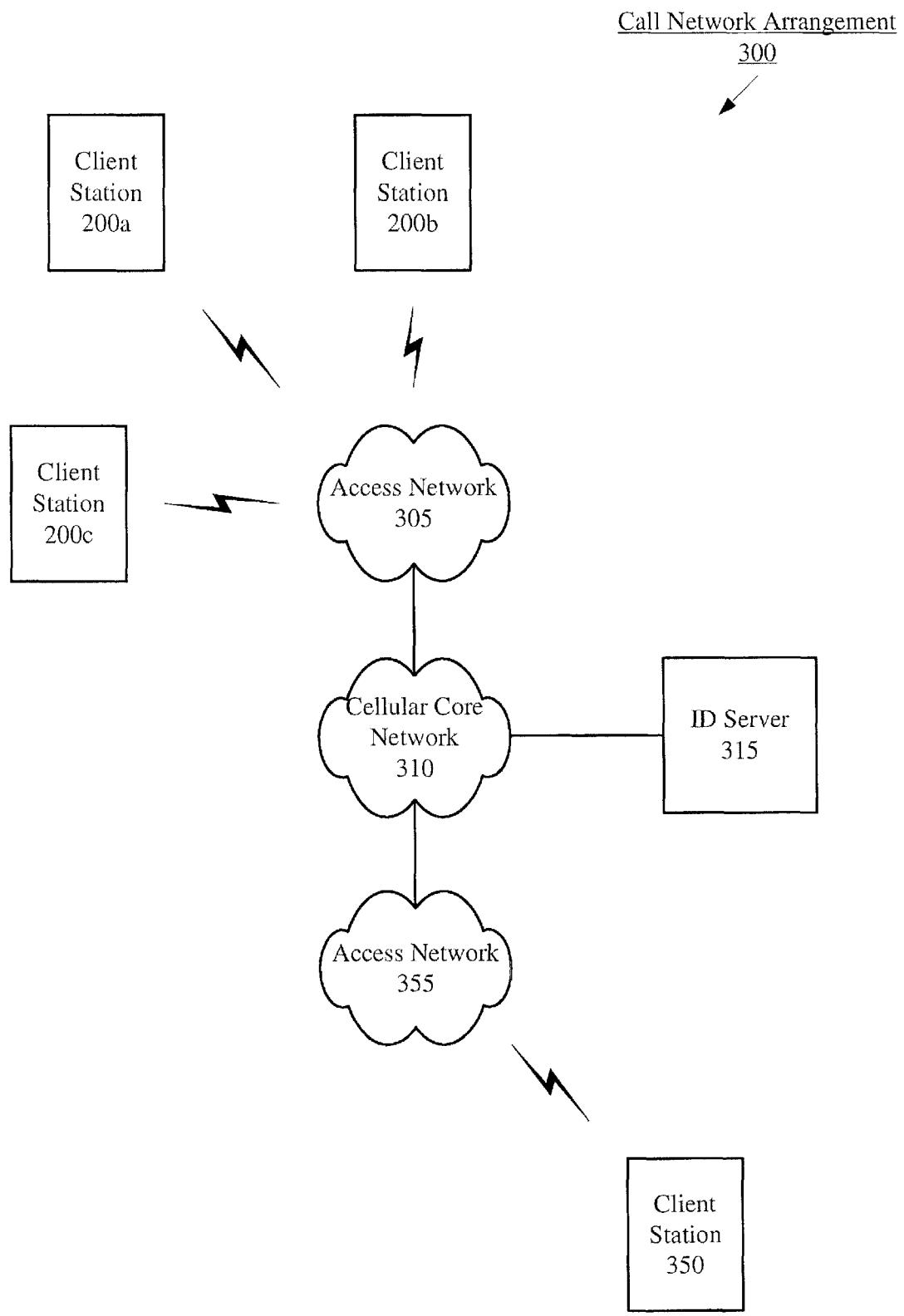
FIG. 3 shows an exemplary call network arrangement.

FIG. 3 shows an exemplary call network arrangement 300. The call network arrangement 300 may represent a specific embodiment of the network arrangement 100 when the call application, the propagation application 240, and the transfer application 245 are used. For example, the call network arrangement 300 includes client stations 200a-c that may represent the client stations 110-114, respectively. The client stations 200a-c may also include the components and applications described above with regard to client station 200 of FIG. 2. As noted above, the client stations 200a-c may also be associated with each other using an association method that will be described in further detail below.

The network arrangement 100 also includes the various different access networks such as the legacy RAN 120, the LTE-RAN 122, and the WLAN 124. The call network arrangement 300 includes an access network 305 that may be any of these various types of access networks. It should be noted that the client stations 200a-c all communicating via the access network 305 may representative of a single access network, a respective access network for each of the client stations 200a-c, or a combination thereof. Via the access network 305, the client stations 200a-c may communicate with the cellular core network 310. The cellular core network 130 of the network arrangement 100 may be substantially similar to cellular core network 310 of the call network arrangement 300 including the above described functionalities thereof.

The call network arrangement 300 further includes an identification (ID) server 315. The ID server 315 may be a portion of the network services backbone 160 described above with regard to the network arrangement 100. Specifically, the ID server 315 may associate the client stations 200a-c under a single user account. This association among the client stations 200a-c may enable the propagation application 245 to provide the call identification upon a call being established. As will be described in further detail below, the ID server 315 may also be configured as an intermediary component that receives the call identification, determine the client stations associated with the source of the call identification transmitting device, and propagates the call identification to the other associated client stations.

The client station 350 may be substantially similar to the client stations 200a-c. However, the client station 350 may be a device used by another user. For example, the client station 350 may be independent or unassociated with the client stations 200a-c. As related to the call functionality, one of the client stations 200a-c may be a first station participating in the call session while the client station 350 may be a second station participating in the call session. Accordingly, the client station 350 may also be connected to the cellular core network 310 using, for example, access network 355, which may or may not be the same as access network 305.

The call network arrangement 300 may provide an architecture in which the call session may be performed as well as for the transfer functionality to be performed. However, prior to the transfer functionality according to the exemplary embodiments is performed, the client stations 200a-c may be associated with one another. As discussed above, the ID server 315 may provide this functionality, which is a portion of the network services backbone 180.

Figure 4:
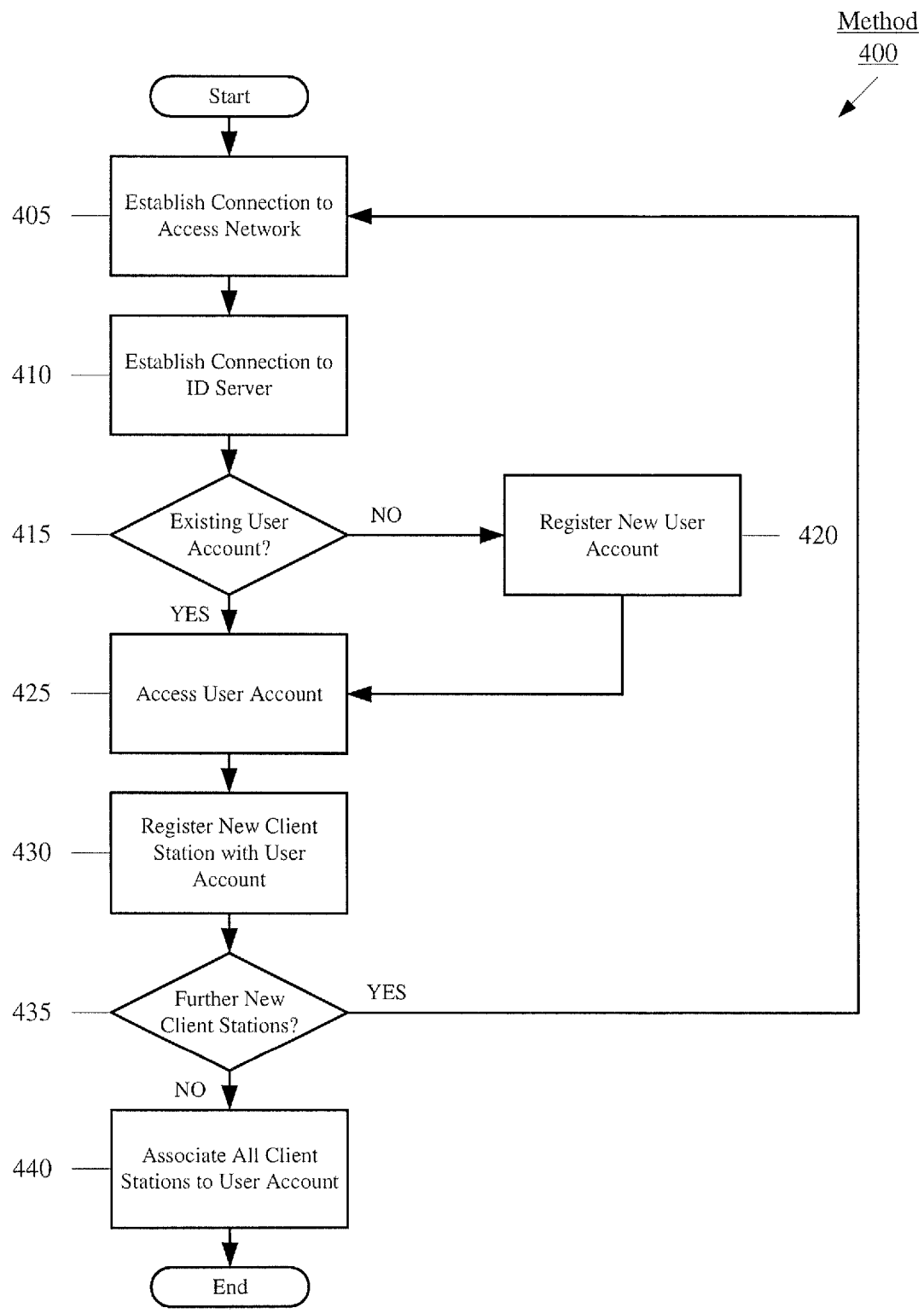
FIG. 4 shows an exemplary method for associating client stations to a user account.

FIG. 4 shows an exemplary method 400 for associating the client stations 200a-c to a user account. The method 400 will be described with regard to the call network arrangement 300 of FIG. 3. As discussed above, the client stations 200a-c may be owned or utilized by a single user. It may be assumed that the client stations 200a-c are not associated with a user account or among each other.

In step 405, the user selects a client station such as client station 200b to establish a connection to the access network 305 via, for example, the transceiver 225. As discussed above, the access network 305 may be the legacy RAN 120, the LTE-RAN 122, the WLAN 124, etc. Upon connecting to the access network 305, the client station 200b may also establish a connection to the cellular core network 310. Once connected to the cellular core network 310, in step 410, the client station 200b may further establish a connection to the ID server 315.

In step 415, the user of the client station 200b may access a user account, which is a feature of the ID server 315. The user may access the user account by, for example, providing a user ID and password for the account. The user account and other user accounts may be stored on a network storage device such as a database. The ID server 315 may retrieve the user account when the user provides the proper information. As discussed above, accessing the user account may also provide access to other functionalities provided by the network services backbone 160. Thus, if the user has already created a user account, the client station 200b continues the method 400 to step 425 in which the user account is accessed. However, if the user has not created a user account, the client station 200b continues the method 400 to step 420 in which the user may register a new user account. For example, the user may be prompted to provide various inputs (e.g., name, login name, password, etc.). Subsequently, the client station 200b continues the method 400 to step 425.

In step 430, the client station 200b may be registered with the user account. For example, the user may manually provide information specific to the client station 200b that identifies the client station 200b. In another example, the client station 200b may provide information to the ID server 315 that identifies the client station 200b. Once the client station 200b has been registered with the user account, in step 435, further client stations such as client stations 200a, c may be registered with the user account. Specifically, each of the client stations a, c may return the method 400 to step 405 and perform steps 405-430. Once all client stations 200a-c are registered with the user account, the client stations 200a-c continue the method 400 to step 440. In step 440, the ID server 315 associates all the client stations to the user account as well as to each other.

It should be noted that step 435 may be performed at various times. For example, when the user is capable of using all the client stations 200a-c concurrently, the registration process may be performed within a single session of accessing the user account on the ID server 315. In another example, the user may only have the client station 200b. The user account may be created and the client station 200b may be registered thereto. At a subsequent time, the user may purchase the client station 200a and register this client station to the user account. Thereafter, the client station 200a may be associated with the user account and the previously registered client station 200b.

As discussed above, the call may be established between one of the client stations 200a-c and the client station 350. For example, the client station 200b may perform a call session with the client station 350. Thus, the client station 200b may connect to the cellular core network 310 via the access network 305 and the client station 350 may likewise connect to the cellular core network 310 via the access network 355. To perform the call, the client station 200b or the client station 350 may originate the call. That is, one of these client stations may transmit the invite for the other client station to answer in order to initiate the call. Each scenario will be discussed where the client station 200b originates or receives a call.

Figure 5:
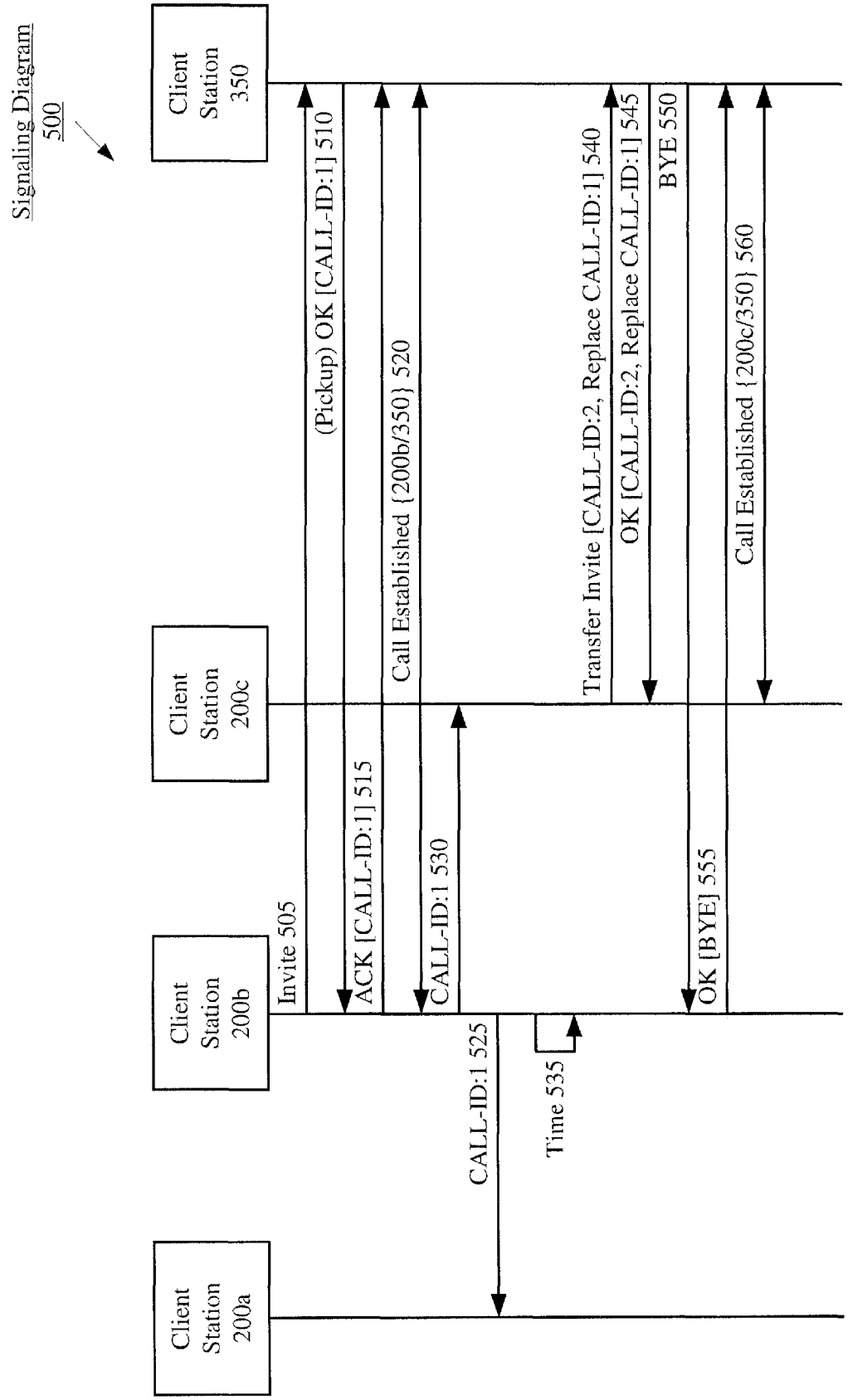
FIG. 5 shows an exemplary signaling diagram for transferring a call being originated.

FIG. 5 shows an exemplary signaling diagram 500 for transferring a call being originated. Again, for illustrative purposes, the signaling diagram 500 is shown where the client station 200b is used as the first device to participate in the call session with the client station 350. However, the client stations 200a, c may also be used.

When initiating the call, the call application of the client station 200b may be used where contact information for the client station 350 is used to generate an invite 505. For example, the call application may store a contact list in the memory 210 that includes a variety of different contacts and respective contact information. In another example, the user of the client station 200b may manually enter the contact information to generate the invite 505. The invite 505 may be, for example, a Session Initiation Protocol (SIP) invite. However, it should be understood that the exemplary embodiments are not limited to any particular type of call setup and may encompass any manner of setting up calls as are supported by the RAN to which the client stations are connected. Upon generating the invite 505, it is transmitted to the client station 350. It should be noted that the invite 505 is transmitted from the client station 200b to the client station 350 through various networks and network components. However, for illustrative purposes, only the end points of the transmission are shown in the signaling diagram 500. As discussed above, the invite 505 may be transmitted from the client station 200b to the access network 305, the cellular core network 310, the access network 355, and ultimately to the client station 350. Furthermore, other networks and network components may be used to transmit the invite. For example, if the call is for a Voice over IP (VoIP) call, the IMS 150 may also be used.

Once the client station 350 and, more specifically, the call application of the client station 350 receives the invite 505, the client station 350 may prompt the user of the client station 350 of the incoming call invitation. For example, the client station 350 may generate an audio signal (e.g., a ring) or sensory signal (e.g., a vibration). The user of the client station 350 may enter an input to respond to the call invitation 505. Thus, the call application of the client station 350 may generate an OK response 510. The call application of the client station 350 may also generate a call identification to be used for the upcoming call session. For example, the call identification may be CALL-ID:1. The client station 350 may transmit the OK response 510 with the CALL-ID:1. The OK response 510 with the CALL-ID:1 may be transmitted from the client station 350 to the client station 200b using a reverse route through the networks and network components of the invite 505.

The CALL-ID:1 may be the call identification used in a SIP process for the call session between the client station 200b and the client station 350. Specifically, the SIP process may utilize a tuple of a "from-tag," a "to-tag," and a "Call-ID." Thus, in the above process, the "from-tag" may indicate the client station 200b, the "to-tag" may indicate the client station 350, and the "Call-ID" may be the CALL-ID:1. However, the Call-ID may be some other identifier that is assigned to the call that uniquely identifies the call.

The client station 200b may receive the OK response 510 to the invite 505 and determine the CALL-ID:1 included in the OK response 510. The client station 200b may further respond to the OK response 510 by transmitting an acknowledgement (ACK) 515 back to the client station 350. The ACK 515 may also indicate the use of the CALL-ID:1 for the call session. Subsequently, the call 520 may be established between the client station 200b and the client station 350.

According to the exemplary embodiments, once the call has been established, the propagation application 240 of the client station 200b may propagate (at 525, 530) the call identification (i.e., CALL-ID:1) to the client stations 200a, c. Specifically, the propagation application 240 of the client station 200b may transmit the CALL-ID:1 to the ID server 315. The ID server 315 may forward the CALL-ID:1 to the client stations 200a, c. Thus, the client stations 200a, c may store the CALL-ID:1. As discussed above, the client stations 200a-c may all be associated with each other. The ID server 315 may determine that the client station 200b provided the CALL-ID:1 and determine whether there are any client stations that are associated with the client station 200b or with the user account associated with the client station 200b. Upon determining that client stations 200a, c are associated client stations, the ID server 315 may forward the CALL-ID:1 to these associated client stations 200a, c.

It should be noted that the propagation of the CALL-ID:1 to the associated client stations 200a, c may utilize a variety of different security mechanisms. For example, since the client stations 200a, c have already been indicated as being associated with the same user account as the client station 200b and therefore are also associated with each other. In this respect, the client stations 200a-c may know that the other stations are valid and trusted for confidential or proprietary information.

At a subsequent time 535, the user of the client station 200b may wish to transfer the call or use a different client station. For example, the client station 200b may be a desktop terminal and therefore immobile. The client station 200b may nevertheless be used to start the call session 520. At this subsequent time 535, the user may wish to continue the call but needs to leave the area in which the client station 200b is disposed. The user may wish to use the client station 200c that may be a mobile device. In another example, the client station 200b may be a mobile device that utilizes a limited power supply. During the course of the call, the power supply may be nearly depleted. Thus, at this subsequent time 535, the user may wish to continue the call but would otherwise be unable to continue unless the call is transferred. Thus, the client station 200c may be used which has access to an unlimited power supply.

As noted above, the exemplary embodiments relate to a transfer functionality performed by the transfer application 245 in which the transfer functionality is performed by grabbing the active call. Thus, the user may utilize the client station 200c to perform the transfer functionality. Specifically, the client station 200c may generate an invite 540 that is sent to the client station 350.

As discussed above, the SIP tuple includes the "from-tag," the "to-tag," and the "Call-ID" to establish a call session between two client stations. For the client station 200c to replace the client station 200b in an active call session, the client station 200c is required to possess the dialog information. More specifically, the client station 200c is required to know the CALL-ID:1. Furthermore, the client station 200b has to be able to trust that the client station 200c is a valid and trusted (and not malicious) user of the dialog information to grab the call. The above manner of propagating the CALL-ID:1 provides the mechanism to provide the CALL-ID:1 to authenticated devices.

Thus, with the CALL-ID:1, the client station 200c is capable of grabbing the active call for the transfer application 245 to perform the transfer functionality. As shown, the client station 200c may transmit a transfer invite 540 that includes another call identification (CALL-ID:2) that is to be used between the client station 200c and the client station 350 for the subsequent transferred call session. It should be noted that in contrast to the original invite 505, the transfer invite 540 may include the call identification information whereas the original invite utilized an OK response to include the call identification information. The transfer invite 540 may also include a command to replace the existing call having the call identification of CALL-ID:1. With the CALL-ID:1 being identical to the CALL-ID:1 information of the active call known by the client station 350, the replace command may be used. It should again be noted that the route through the network and the network components may be substantially similar to that described above for the invite 505 transmitted by the client station 200b to the client station 350.

Upon receiving the transfer invite 540, the client station 350 may determine that the invite 540 is to replace the client station 200b with the client station 200c for the active call session 520 having the call identification of CALL-ID:1. The client station 350 is also to use the call identification of CALL-ID:2 for the transferred call. The client station 350 may respond to the transfer invite 540 by transmitting an OK response 545 back to the client station 200c. The OK response 545 may indicate the use of the CALL-ID:2 for the call session. With the successful grab of the active call session, a teardown is performed for the previous connection between the client station 200*b* and the client station 350. Thus, the client station 350 may generate and transmit a BYE signal 550 to the client station 200*b* whereas the client station 200*b* responds to the BYE signal 550 with an OK response 555 of the BYE signal. Subsequently, the call 560 may be established between the client station 200*c* and the client station 350.

Using the above manner of propagating the dialog information including the call identification, an active call session between a first client station and a further client station may be transferred to a second client station and the further client station. More specifically, the second client station may grab the active call session from the first client station using the call identification information that was transferred to the second client station by the ID Server 315 because the second client station is related to the first client station.

It should be noted that upon the active call session being transferred from the client station 200*b* to the client station 200*c*, the call identification information may again be propagated. Specifically, the CALL-ID:2 may be propagated from the client station 200*c* to the client stations 200*a*, *b*. Again, the CALL-ID:2 may be transmitted from the client station 200*c* to the ID server 315 which forwards this information to the other client stations 200*a*, *b*. In this way, should another transfer be used, the client stations 200*a*, *b* may have the call identification information for use in the transfer functionality as discussed above. This process may continue until the call session terminates.

It should also be noted that the call identification information that is propagated may include a timing feature such that the call identification information may be used for a period of time. For example, the call identification information may be propagated with a timer. The timer may be a predetermined period of time that the call identification information may be used. Thus, upon expiry of the timer, the call identification information may no longer be used. However, the exemplary embodiments may include a further mechanism to verify that the call identification information is no longer being used. Specifically, the client stations to which the call identification information was propagated may transmit a query to the ID server 315 that verifies that the call session having the call identification information has terminated. If terminated, an ACK may be transmitted. However, if still ongoing, the ID server 315 may again propagate the call identification information. In another example, the call identification information may be propagated with no time limit. However, the ID server 315 may receive information upon the call session being terminated. This may prompt the ID server 315 to transmit a signal indicating that the call session has terminated and the propagated call identification information may be deleted.

Figure 6:
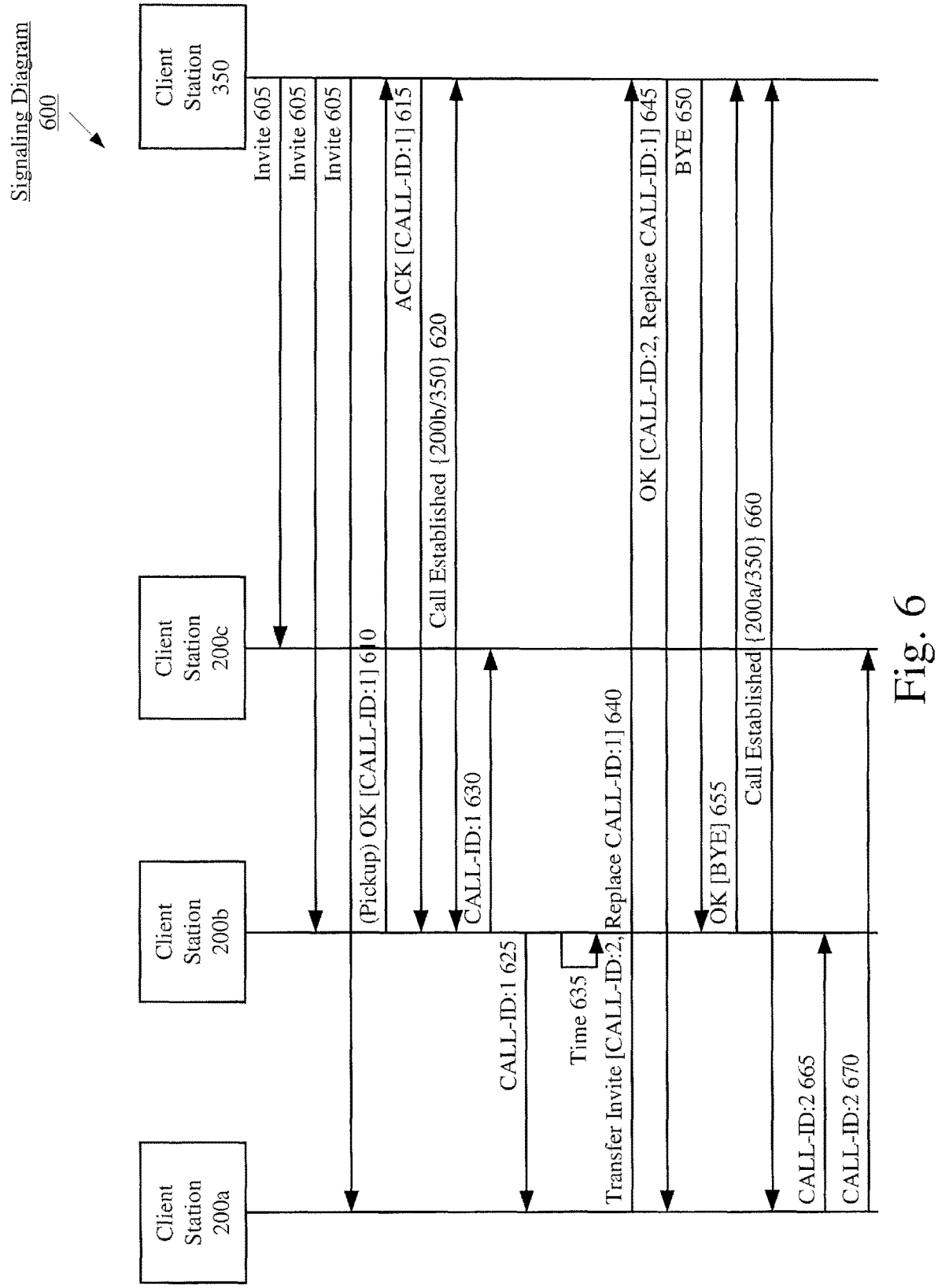
FIG. 6 shows an exemplary signaling diagram for transferring a call being received.

FIG. 6 shows an exemplary signaling diagram 600 for transferring a call being received. Again, for illustrative purposes, the signaling diagram 600 is shown where the client station 200*b* is used as the first device to participate in the call session with the client station 350. However, the client stations 200*a*, *c* may also be used.

In contrast to the signaling diagram 500, when initiating the call, the call application of the client station 350 may be used where contact information for the client station 200*b* is used to generate an invite 605. Upon generating the invite 605, it is transmitted to the client station 200*b*. Again, the invite may be transmitted from the client station 350 to the access network 355, the cellular core network 310, the access network 305, and ultimately to the client station 200*b*. However, the association of the client stations 200*a-c* with each other also prompts the invite 605 to be transmitted to the other client stations 200*a*, *c* as well. Specifically, by being transmitted through the cellular core network 310, the network services backbone 160 and the ID server 315 may determine that the invite is to be forwarded to these other client stations 200*a*, *c* as well in view of their previously indicated association. Once the client stations 200*a-c* and, more specifically, the call applications of the client stations 200*a-c* receive the invite 605, the user may select one of the client stations 200*a-c* to participate in the call session. Thus, in this example, the client station 200*b* may prompt the user of the client station 200*b* of the incoming call invitation. The user of the client station 200*b* may enter an input to respond to the call invitation. The call application of the client station 200*b* may generate an OK response 610. The call application of the client station 200*b* may also generate a call identification to be used for the upcoming call session. For example, the call identification may be CALL-ID:1. The OK response 610 with the CALL-ID:1 may be transmitted from the client station 200*b* to the client station 350 using a reverse route through the networks and network components of the invite 605.

The client station 350 may receive the OK response 610 to the invite 605 and also determine the CALL-ID:1 included in the OK response 610. The client station 350 may further respond to the OK response by transmitting an ACK 615 back to the client station 200*b*. The ACK 615 may also indicate the use of the CALL-ID:1 for the call session. Subsequently, the call 620 may be established between the client station 200*b* and the client station 350.

Once the call has been established, the propagation application 240 of the client station 200*b* may propagate 625, 630 the call identification to the client stations 200*a*, *c* using the above mechanism as described with regard to the signaling diagram 500. Furthermore, at a subsequent time 635, the user of the client station 200*b* may wish to transfer the call. Using the stored call identification information from the propagation, the transfer functionality may be performed for (in this case) the client station 200*a* to grab the active call session. Specifically, the client station 200*a* will transmit a transfer invite 640 to the client station 350 with the CALL-ID:2 that is to replace the CALL-ID:1. The client station 350 will respond with an OK response 645 to the client station 200*a* and send a BYE signal 650 to the client station 200*b*. The client station 200*b* will respond with an OK response 655 to the BYE signal 650 and call session 660 will be established between the client station 200*a* and client station 350.

In addition, as has been discussed above, after the call session 660 has been established between the client station 200*a* and the client station 350, the client station 200*a* may propagate 665, 670 the CALL-ID:2 to each of the stations 200*b*, *c*, respectively. An exemplary manner of propagating the CALL-ID:2 using the ID server 315 was described above. Thus, when the call session 660 is active, the client station 200*b* or client station 200*c* may grab this active session using the CALL-ID:2. This example shows that a call session may be transferred multiple times.

Figure 7:
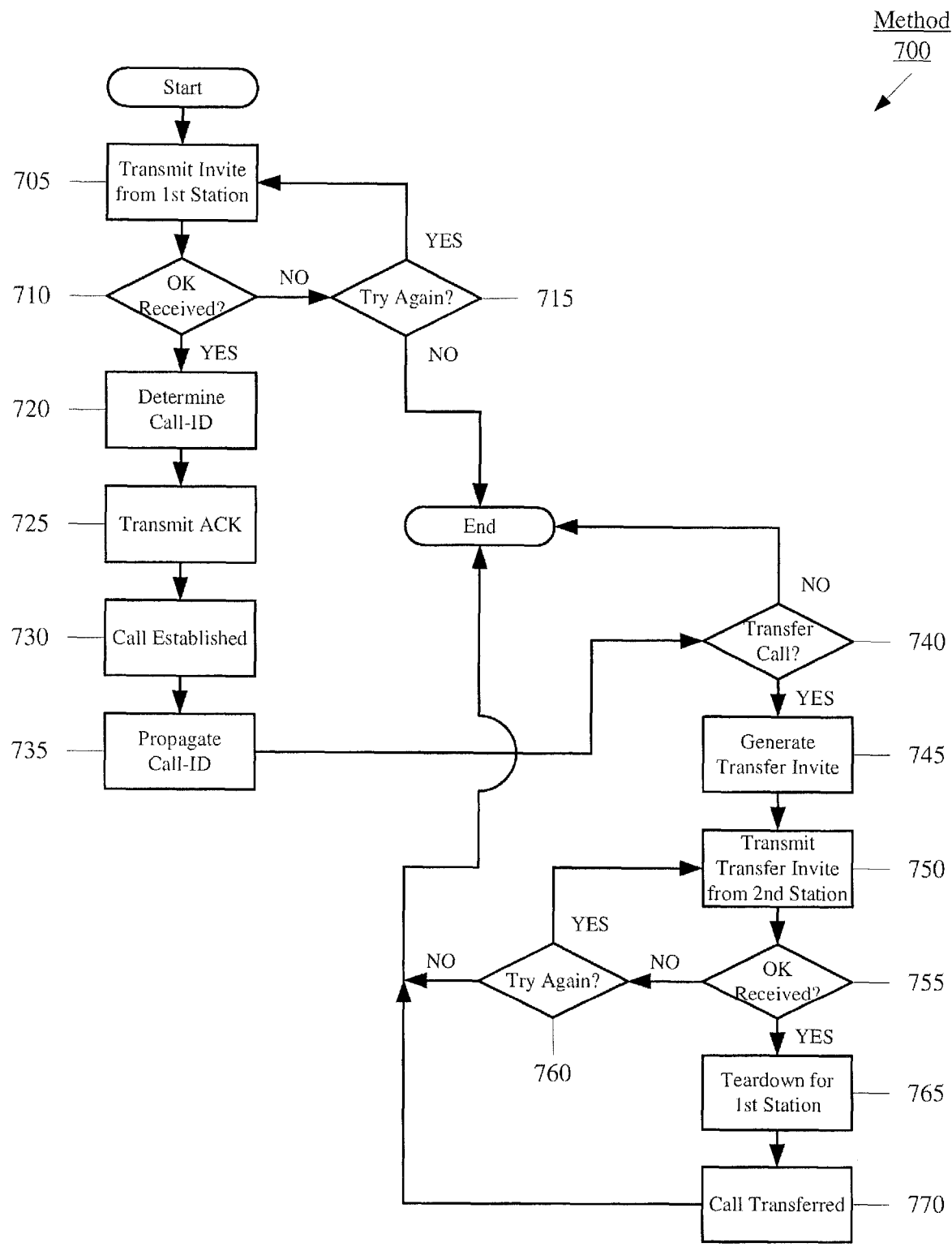
FIG. 7 shows an exemplary method for transferring a call being originated.

FIG. 7 shows an exemplary method 700 for transferring a call being originated. The method 700 relates to a substantially similar process as described above with regard to the signaling diagram 500. Thus, the method 700 will be described with regard to the network arrangement 100, the client station 200, and the call network arrangement 300. The method 700 will also be described with regard to the client station 200*b* being a first participant in a call session and the client station 200c being a second participant in the call session upon performing a transfer functionality.

In step 705, the client station 200b transmits an invite to the client station 350. As discussed above, the call application of the client station 200b may be used in which contact information of the client station 350 forms a basis for generating the invite. The invite may be transmitted from the client station 200b to the access network 305, the cellular core network 310, the access network 355, and the client station 350. Upon transmitting the invite, in step 710, the client station 200b determines whether an OK response is received from the client station 350. For example, the OK response may not be received due to a network error. In another example, the OK response may not be received due to the user of the client station 350 declining the invite. The determination as to whether the OK response is received may be based upon a predetermined time period. Thus, if the OK response is not received in this time period, the client station 200b continues the method 700 to step 715 where a further attempt may be made.

If the OK response is received, the client station 200b continues the method 700 to step 720. In step 720, the client station 200b determines the call identification information included in the OK response. As discussed above, upon receiving the invite, the client station 350 may receive the invite, generate the OK response, generate the call identification to be used for the upcoming call session (e.g., CALL-ID:1), include the call identification in the OK response, and transmit the OK response with the call identification to the client station 200b. Thus, upon receiving OK response, the CALL-ID:1 may be determined. In step 725, the client station 200b may transmit an ACK that the OK response was received and acknowledge the CALL-ID:1 for use in the call session. Thereafter, in step 730, the call session between the client station 220b and the client station 3350 may be established.

In step 735, the CALL-ID:1 is propagated from the client station 200b to the client stations 200a, c. As discussed above, the client stations 200a-c may be associated with each other. For the method 700, it may be assumed that the client stations 200a-c have already been properly associated with a user account and with each other prior to the call session being initiated. Thus, the CALL-ID:1 may be transmitted from the client station 200b to the ID server 315 that determines the associated client stations 200a, c and forwards the CALL-ID:1 thereto. The client stations 200a, c may store the CALL-ID:1 on a respective memory 215 thereof.

In step 740, the user of the client station 200b determines whether the call is to be transferred. If no transfer is to take place, the call session continues between the client station 200b and the client station 350. However, if the call session is to be transferred from the client station 200b to, for example, the client station 200c, the client station 200c continues the method 700 to step 745.

In step 745, the client station 200c generates a transfer invite. As discussed above, the transfer invite may include a further call identification such as CALL-ID:2 as well as a command to replace the original call identification of CALL-ID:1 with CALL-ID:2. In step 750, the client station 200c transmits the transfer invite with the CALL-ID:2 and the replace command to the client station 350. Again, the transfer invite may be transmitted from the client station 200c to the access network 305, the cellular core network 310, the access network 355, and the client station 350.

Upon transmitting the transfer invite, in step 755, the client station 200c determines whether an OK response is received from the client station 350. If the OK response is not received, the client station 200c continues the method 700 to step 760 where a further attempt may be made. If the OK response is received, the client station 200b continues the method 700 to step 765. Specifically, the client station 350 transmits a BYE signal to the client station 200b for the existing connection therebetween for the active call session. The client station 200b may transmit an ACK in response to the BYE signal for the teardown procedure. Once the teardown for the connection between the client station 200b and the client station 350 is performed, in step 770, the call session may be transferred from the client station 200b to the client station 200c.

It should be noted that the above described method 700 may include further steps. For example, as discussed above, the further call identification of CALL-ID:2 that is used for the connection in the call session between the client station 200c and the client station 350 may also be propagated. Thus, the client station 200c may continue the method 700 to return to step 735.

Figure 8:
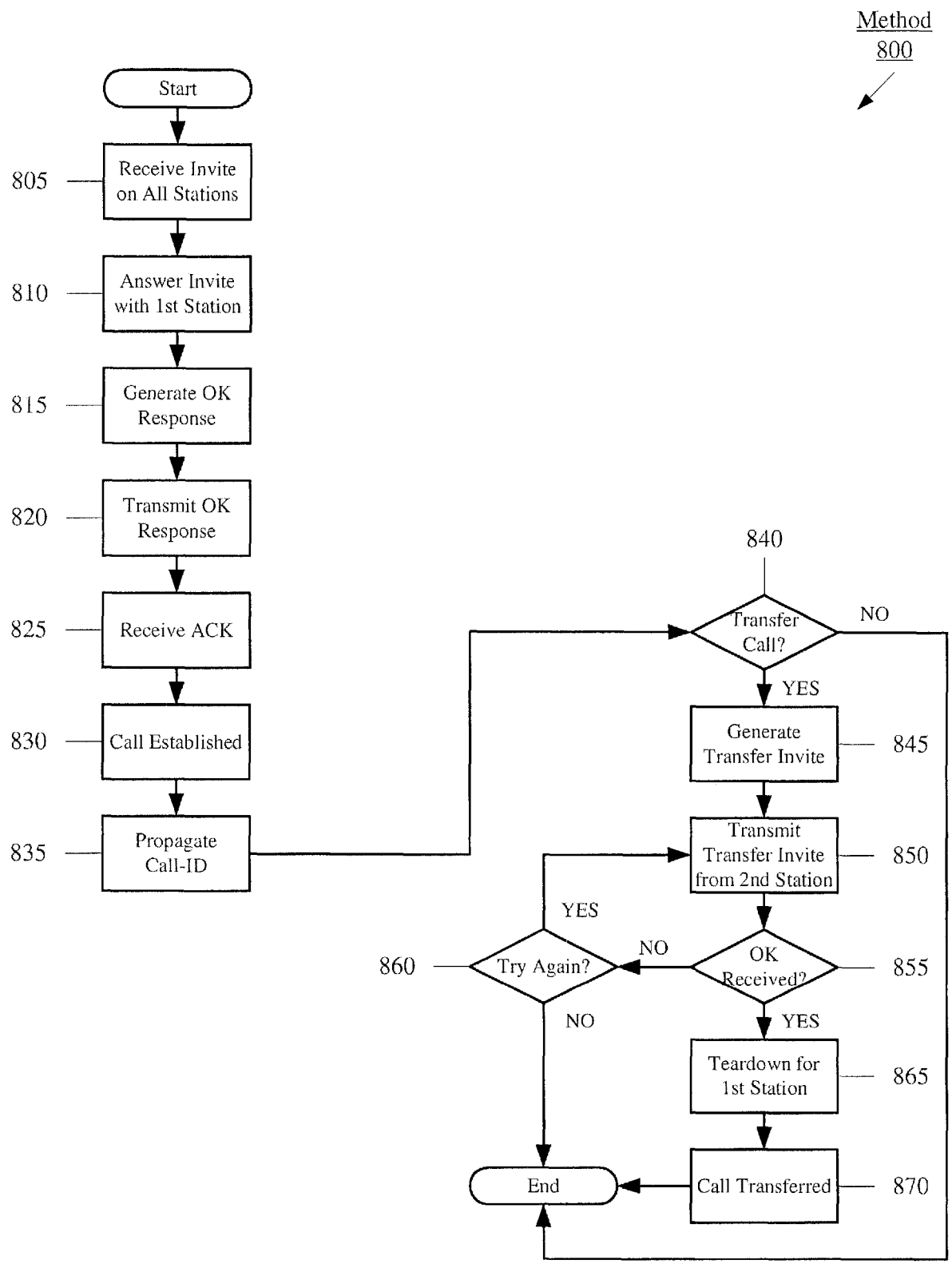
FIG. 8 shows an exemplary method for transferring a call being received.

FIG. 8 shows an exemplary method 800 for transferring a call being received. The method 800 relates to a substantially similar process as described above with regard to the signaling diagram 600. Thus, the method 800 will be described with regard to the network arrangement 100, the client station 200, and the call network arrangement 300. The method 800 will also be described with regard to the client station 200b being a first participant in a call session and the client station 200a being a second participant in the call session upon performing a transfer functionality.

In step 805, the client stations 200a-c receive an invite from the client station 350. As discussed above, the call application of the client station 350 may be used in which contact information of the client station 200b forms a basis for generating the invite. The invite may be transmitted from the client station 350 to the access network 305, the cellular core network 310, the access network 355, and the client stations 200a-c. Specifically, the ID server 315 may determine that the invite being transmitted specifically to the client station 200b is also to be forwarded to associated client stations such as client stations 200a, c. Thus, the invite may originally be intended for a single client station but due to the association of the client station with other client stations and under a common user account, the invite may be forwarded to all associated client stations.

Upon transmitting the invite, in step 710, the user selects the client station 200b and answers the invite such as entering an answering input. In step 815, the client station 200b generates an OK response. As discussed above, the OK response to an invite may include a call identification to be used for the upcoming call. Thus, the call application of the client station 200b may generate this call identification such as CALL-ID:1 to be included in the OK response. In step 820, the client station 200b transmits the OK response with the call identification to the client station 350. Upon transmitting the OK response, in step 825, the client station 200b receives an ACK from the client station 350 that indicates that the OK response was received and acknowledge the CALL_ID:1 for use in the call session. Thereafter, in step 830, the call session between the client station 200b and the client station 350 may be established. In step 835, the CALL-ID:1 is propagated from the client station 200b to the client stations 200a, c using the above described mechanism.

Subsequently, there may be a need or desire to transfer the call session from the client station 200b to the client station 200a. Thus, steps 840-870 may be performed which are substantially similar to the above described steps 740-770 for the method 700, respectively. It should also be noted that the method 800 may also include further steps such as that described above in which the method 800 may continue after step 870 by returning to step 835 if a further transfer is to occur and the new call identification is to be propagated upon transferring the call session to the client station 200a.

The exemplary embodiments provide a system and method of a transfer functionality for a call session between a first client station and a further client station to a second client station and the further client station in which the first and second client stations are associated with each other such that call identification information of the call session may be propagated from the first client station to the second client station. In establishing a call session between stations, the tuple may include an identity of an originating station, an identity of a terminating station, and call identification information. The first and second client stations may be associated with one another via a common user account such that the second client station may initiate the transfer functionality by generating a transfer invite for the further client station that includes a new call identification as well as a replace command that includes the original call identification. In this manner, the transfer functionality may be performed by grabbing the active call session by the second client station whereas other transfer functionalities entail forwarding the active call session by the first client station.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method comprising:
at a first station:
receiving a first call identification of a first communication session between a second station and a third station from a network device via the second station upon establishment of the first communication session, wherein the network device propagates the first call identification to at least the first station based on at least information stored at the network device indicating that the first station is associated with a first user account and that the second station is associated with the first user account;
receiving an input, subsequent to the first call identification of the first communication session, the input configured to trigger the first station to replace the first communication session;
transmitting an invite to the third station during the first communication session between the second station and the third station, wherein the invite comprises at least the first call identification, and indicates to the third station that the first communication session with the second station is to be replaced by a second communication session with the first station; and
establishing the second communication session with the third station.

2. The method of claim 1, further comprising:
transmitting user information to the network device; and
transmitting first station information of the first station to associate the first station with the first user account.

3. The method of claim 2, wherein the second station transmits second station information to the network device to associate the second station with the user account.

4. The method of claim 1, further comprising:
transmitting the second call identification to the network device upon the second communication session being established.

5. The method of claim 1, wherein the first communication session and the second communication session are part of an active call and wherein the second communication session is established without terminating the active call.

6. The method of claim 1, wherein the input comprises a user input configured to initiate the transmitting of the invite, wherein the user input is received via an I/O component of the first device.

7. A method, comprising:
at a first station:
establishing a first communication session with a second station, wherein the first communication session is identified by a first call identification;
transmitting the first call identification to a network device, wherein the network device propagates the first call identification to at least a third station upon establishment of the first communication session and prior to a transfer application being initiated at the third station to replace the first communication session with the second station with a second communication session between the third station and the second station, wherein the network device includes stored data indicating that the first station is associated with a first user account and that the third station is associated with the first user account and the propagation of the first call identification to the third station is based on the first station and the third station being associated with the first user account; and
terminating the first communication session with the second station when the first communication session is replaced by the second communication session between the third station and the second station, wherein the third station transmits a transfer invite to the second station comprising at least the first call identification, a second call identification and a command to replace the first communication session during the first communication session with the second station to initiate the establishment of the second communication session.

8. The method of claim 7, wherein establishing the first communication session includes
transmitting an invite to the second station for the first communication session to be performed;
receiving a response to the invite from the second station, the response including the first call identification to be used for the communication session; and
transmitting an acknowledgement to the second station indicating the response was received and the first call identification is acknowledged.

9. The method of claim 7, wherein establishing the first communication session includes:
receiving an invite from the second station for the first communication session to be performed, the invite also being received by the third station based the first station and the third station being associated with the first user account.

10. The method of claim 9, wherein establishing the first communication session includes:
generating the first call identification to identify the first communication session;
transmitting a response to the invite to the second station, the response including the first call identification to identify the communication session; and
receiving an acknowledgement from the second station indicating the response was received and the call identification is acknowledged.

11. The method of claim 7, further comprising:
transmitting user information to the network device; and
transmitting first station information of the first station to associate the first station with the first user account.

12. The method of claim 11, further comprising:
at the second station:
transmitting second station information of the second station to associate the second station with the first user account.

13. The method of claim 7, further comprising:
after the communication session has been terminated, receiving a second call identification identifying the second communication session from the network device based on the first station and the third station being associated with the first user account.

14. A first station, comprising:
a processor configured to:
receive a first call identification of a first communication session between a second station and a third station from a network device via the second station upon establishment of the first communication session, wherein the network device propagates the first call identification to at least the first station based on at least information stored at the network device indicating that the first station is associated with a first user account and that the second station is associated with the first user account;
receive an input, subsequent to the first call identification of the first communication session, the input configured to trigger the first station to replace the first communication session; and
generate an invite to be transmitted to the third station during the first communication session, wherein the invite comprises at least the first call identification, and indicates to the third station that the first communication session with the second station is to be replaced by a second communication session with the first station; and
a transceiver configured to transmit the invite to the third station and wherein the processor and the transceiver are configured to establish the second communication with the third station.

15. The first station of claim 14, wherein the transceiver is further configured to transmit the second call identification to the network device upon the second communication session being established.

16. The first station of claim 14, wherein the first communication session is a first portion of an active call and the second communication session is a second portion of the active call.

17. The first station of claim 14, wherein establishing the second communication session between the first station and the third station corresponds to the first communication session between the second station and the third station being terminated.

18. The first station of claim 14, wherein the first call identification is transmitted to the network device by the third station upon the first communication session being established.

19. The first station of claim 14, wherein the first communication session between the second station and the third station is initiated by an invitation from the third station to the second station, wherein the invitation is only intended for the second station.

20. The first station of claim 14, wherein establishing the second communication session between the first station and the third station includes transmitting a first signal to the second station and receiving a second signal from the second station that indicates an acknowledgment of the first signal by the second station.

* * * * *